United States Patent [19]
Ostendarp et al.

[11] Patent Number: 6,128,925
[45] Date of Patent: Oct. 10, 2000

[54] FORMING TOOL FOR STRUCTURING FLAT MATERIAL, ESPECIALLY PLATE GLASS

[75] Inventors: Heinrich Ostendarp; Marita Paasch, both of Mainz, Germany

[73] Assignee: Schott Glas, Mainz, Germany

[21] Appl. No.: 09/048,635

[22] Filed: Mar. 26, 1998

[30] Foreign Application Priority Data

Mar. 29, 1997 [DE] Germany .................... 197 13 312

[51] Int. Cl.[7] ................................................ C03B 13/08
[52] U.S. Cl. .................... 65/171; 65/174; 65/177; 65/245; 65/255; 65/374.11; 425/193; 425/194; 425/364 R
[58] Field of Search .................. 65/94, 102, 106, 65/171, 174, 177, 245, 255, 256, 370.1, 374.11, 374.13; 425/193, 194, 224, 363, 364 R

[56] References Cited

U.S. PATENT DOCUMENTS

| | | | |
|---|---|---|---|
| 528,240 | 10/1894 | Sievert | 65/362 |
| 661,025 | 10/1900 | Ripley et al. | 65/94 |
| 798,642 | 9/1905 | Wadsworth | 65/94 |
| 798,643 | 9/1905 | Wadsworth | 65/93 |
| 798,644 | 9/1905 | Wadsworth | 65/94 |
| 798,645 | 9/1905 | Wadsworth | 65/94 |
| 907,656 | 12/1908 | Wadsworth | 65/185 |
| 1,028,129 | 6/1912 | Neuhauser | 65/94 |
| 1,261,939 | 4/1918 | Johanson | 65/156 |
| 1,466,621 | 8/1923 | Hancock | 65/255 |
| 1,528,194 | 3/1925 | Burgess | 65/255 |
| 3,238,031 | 3/1966 | Nikoll | 65/94 |
| 3,404,973 | 10/1968 | Nedelec | 65/253 |
| 3,459,525 | 8/1969 | Discry | 65/245 |
| 4,397,673 | 8/1983 | Stevens | 65/374.11 |
| 4,753,669 | 6/1988 | Reese | 65/273 |
| 5,118,543 | 6/1992 | McColl | 428/34 |
| 5,224,978 | 7/1993 | Hermant et al. | 65/94 |
| 5,427,599 | 6/1995 | Greschner et al. | 65/305 |

FOREIGN PATENT DOCUMENTS

| | | |
|---|---|---|
| 0 802 170 A2 | 10/1997 | European Pat. Off. . |
| 1 531 390 | 5/1968 | France . |
| 111 216 | 5/1899 | Germany . |
| 223 379 | 10/1908 | Germany . |
| 506 672 | 8/1930 | Germany . |
| 1-28238 | 1/1989 | Japan . |
| 6-191865 | 7/1994 | Japan . |

*Primary Examiner*—Sean Vincent
*Attorney, Agent, or Firm*—Michael J. Striker

[57] ABSTRACT

The forming tool with a special structuring surface includes a reusable ceramic base tool and a replaceable metallic forming member releasably attached to the base tool and provided with a structuring surface for forming a structure in the plate glass. When the comparatively rapidly wearing forming member must be replaced, especially when structuring to form structures with sharp edges, only replacement of the metallic forming member is necessary. This two-component structure also provides additional freedom regarding selection of materials for the base tool and the structuring surface. Thus the base tool can have a comparatively smaller thermal expansion and/or conductivity and the forming member can have a comparatively higher thermal conductivity.

16 Claims, 3 Drawing Sheets

FORMING TOOL FOR STRUCTURING FLAT MATERIAL, ESPECIALLY PLATE GLASS

CROSS-REFERENCES

The instant subject matter is related to the disclosure in copending U.S. patent application, entitled "Method and Apparatus for making Large-scale Precision Structures in Plate Glass" based on German Patent Application 197 13 311.8-45 of Mar. 29, 1997, Heinrich OSTENDARP, inventor; and also in another copending U.S. patent application, entitled "Process and Apparatus for Hot Forming Precision Structures in Plate Glass" based on German Patent Application 197 13 309.6-45 of Mar. 29, 1997, Heinrich OSTENDARP and Marita Paasch, inventors.

BACKGROUND OF THE INVENTION

The present invention concerns a forming tool for making structures in flat material, especially in plate glass, which comprises a base tool and a separate forming tool arranged on the base tool and provided with a structuring surface.

Plate glass provided with large-scale precision structures is required for precision applications, especially in the optical glass field. This type of glass is used, for example, for display panels of new generation, flat-display-screen devices (Plasma Display Panels (PDP), Plasma Addressed Liquid Crystal (PALC)). Micro-channel structures for control of individual lines or columns, which extend over the entire active display screen width or height and in which a plasma is ignited by electric discharge, are provided in this flat display screen glass. The boundary of an individual channel on both sides is provided by rectangular crosspieces whose width is as small as possible (i.e. <100 $\mu$m). In order to obtain a sufficient discharge volume, the height of the crosspiece is substantially larger than its width. The spacing of the crosspieces should be as small as possible. Currently typical values of between 360 $\mu$m and 640 $\mu\mu$m are achieved in small scale production. The height of the crosspieces amounts to from about 150 $\mu$m to 250 $\mu$m with a width of from 50 $\mu$m to 100 $\mu$m.

During structuring of this flat display screen glass, which for example is a 25"-PALC screen of a size of 360 mm×650 mm, the exact lateral dimensioning, relative positioning and reproducibility of the channels and thus the stability of the forming tool are crucial because of the later positioning of the electrodes. With a method based on hot shaping by means of a conventional chromium-nickel-steel tool, the thermal expansion coefficient amounts to about $12 \times 10^{-6}$/K. For example, for a tool length of about 360 mm, as required for a 25" PALC display screen, this always causes a length change of about 4 $\mu$m per K temperature fluctuation. Considering that the required positioning accuracy of the electrodes in the micro-channels is in the range of $\pm 10$ $\mu$m, a temperature fluctuation of $\pm 2.5$ K can cause considerable problems. The permissible temperature fluctuations are considerably reduced in the larger display screens; for example 42" display screens.

The problems are similar with other applications of plate glass with large-scale precision structures.

The structures in plate glass are formed in two standard ways with the above-described forming tool. The first way is designated as hot forming. In hot forming the heated forming tool with its structuring surface is pressed on one side of the plate glass in the heated glass material and the structures are formed in the glass surface.

In the second way cavities or recesses in the structuring surface of the forming tool are filled with a paste-like material, and the forming tool is applied to a glass surface so that this paste-like material comes into contact with the glass surface and is hardened. This customarily happens with suitable heating.

A comparatively high tool wear occurs on the structuring surface in both ways however, which requires continual replacement of the entire expensive forming tool with a considerable increase in maintenance expense in the case of small structure radii.

Forming tools are described in German Patent DE-PS 111 216 and U.S. Pat. No. 1,261,939, which avoid a continual expensive exchange of the complete forming tool on account of tool wear on its structuring surfaces.

These patent documents describe a forming tool with a structuring surface for formation of structures in plate glass, which comprises a base tool (in the case of DE-PS 111 216 rollers or rollers and/or press plate, in the case of U.S. Pat. No. 1,261,939, rollers) and a separate forming member arranged on the base tool. The separate forming member is provided with the structuring surface (in the case of DE-Patent it is a web or fabric or mesh and in the case of the US-PS, plates 196).

In the case of excessive wear only the separate forming member must be replaced with comparatively small maintenance expense, so that the tool and manufacturing costs for the structured plate glass are reduced.

In the German Patent document the rollers or press plates typically are made from metal. These rollers or press plates thus have sufficiently large thermal conductivity and a comparatively large thermal expansion coefficient, while in contrast the forming member, namely the web or mesh, has a comparatively very small thermal conductivity with comparatively small thermal expansion coefficient. This is also true for the rollers and plates of the U.S. patent, which are both typically made from metal.

In order to perform a hot forming with the known forming tool, the entire forming tool must disadvantageously be heated with an accompanying high-energy consumption and expense. Since the base tool has a comparatively high thermal conductivity and thermal expansion coefficient, the known forming tools experience a comparatively large thermal expansion effect.

SUMMARY OF THE INVENTION

It is an object of the present invention to provide a forming tool of the above-described type with which a reduction of the effect of thermal expansion and a saving of energy during heating of the forming tool are possible.

According to the invention, the forming tool comprises a base tool and a separate forming member arranged on the base tool, wherein the base tool is made from a material with a comparatively reduced thermal conductivity and expansion and the forming member is made from a material with a comparatively higher thermal conductivity.

Because of the structure of the forming tool according to the invention very advantageously the temperature of the base tool can be comparatively lower and only the forming tool must be advantageously heated from the outside. The required energy is thus clearly also reduced when the base tool must be heated. The heat energy can be supplied by a laser, or by electrical, inductive or another suitable type of heating.

Furthermore the effect of thermal expansion on the forming tool according to the invention can be drastically reduced, since only the forming member needs to be heated.

By providing a separate forming member apart from the base tool, which can be formed by a roller or a piston, a material having a comparatively small thermal expansion coefficient and a comparatively large friction coefficient, for example a special ceramic material, such as Quarzal, can be used. Other factors, such as minimal adherence to glass, high tensile strength, high temperature resistance and high thermal conductivity, which are obtained for example by chromium-nickel-steel alloys or platinum-gold alloys, can be considered in selecting the material for the separate forming member.

In a preferred embodiment of the invention the forming tool is formed by a suitably structured thin sheet, which provides a very simple and effective forming member.

Special advantages are attained according to another embodiment of the invention in which a structured sheet is releasably attached to the base tool and is attached so that it can be unwound on the plate glass. In a tool formed in this manner the forming member can be unwound from the base tool during rolling of the base tool on the plate glass. During hot forming in or with the paste-like material or paste filled in the forming member the forming member is pressed on the glass and is left there during the hardening of the structures in or on the plate glass.

A substantially more rapid cooling of the formed structures occurs because of the reduced heat capacity of the separate forming member in comparison to a continuous forming member, which provides a precise formation of these structures.

The base tool is advantageously formed by a roller, which allows an easy large-scale application of structures by rolling of the forming tool on the plate glass.

Instead of a structuring sheet the forming member can also be a strip of material which is attached to and spread over a roller-like base tool or strips of material arranged on the roller-like base tool spaced from each other. This type of forming member permits a linear structuring with simple means because of gaps between the strips.

When in an additional preferred embodiment of the invention a second or auxiliary roller is provided axially parallel to and spaced from the base roller, the strip of material is passed around both rollers several times spaced from itself and is continuously taken off and fed to the roller, the forming member remains in the space between both rollers for a certain time interval analogously to the wound off sheet to stabilize the structures and to prevent loss of shape due to fluidity.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
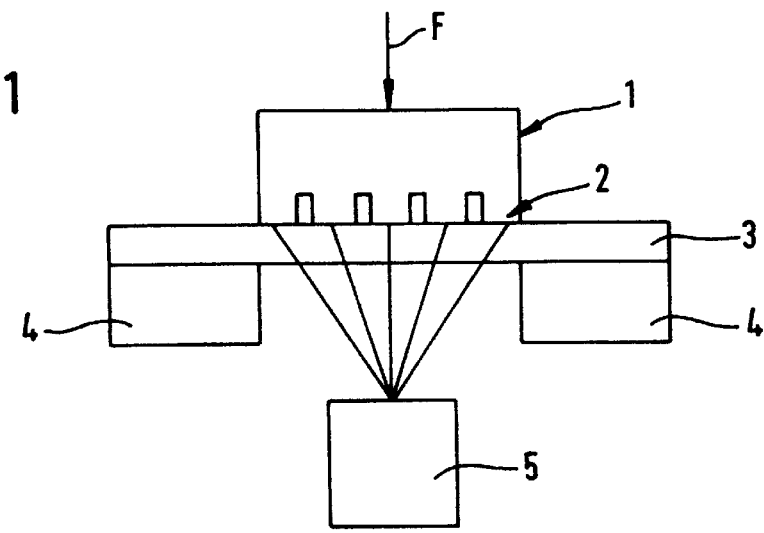
FIG. 1 is a main diagrammatic plan view of an apparatus according to the invention for hot forming of structures in plate glass with heating of a structuring surface of a forming member, which is clamped on a base tool, according to the invention by means of a laser.

FIG. 1 shows an apparatus for a process for forming large-scale precision structures—here in the form of channels that are separated by crosspieces—in a plate glass or glass plate 3, which in the present embodiment is a plate glass with micro-channel structures for a flat display screen. The apparatus provides a forming tool 1 with a separate structuring surface 2, which is pressed by means of a force F on the upper side of a heated plate glass 3, in order to form the described precision structures there. The apparatus has counter-force-taking members 4, in order to balance the applied force F relative to the plate glass 3. The forming tool 1 is heated immediately prior to and/or during contact with the glass surface from the exterior locally. However the structuring surface 2 of the forming tool 1 is only heated to the predetermined required process temperature up to a surface depth predetermined by the height of the structures. In the present embodiment laser radiation is directed through the plate glass 3 to the structuring surface 2 of the forming tool 1 by means of a laser 5 for local heating of the structuring surface 2. Alternatively an inductive or electrical resistance heating can be performed. Because the heat energy is only supplied locally to the structuring surface, a complete heating of the forming tool and the plate glass can be avoided.

The laser 5 is selected so that it produces laser radiation that has as high as possible a transmission through the selected plate glass, i.e. no noteworthy heating of the glass occurs, and that heats the structuring surface 2 to a temperature at which a melting occurs on contact with the glass.

A Nd-YAG laser (wavelength 1064 nm) and a high power diode laser (wavelength about 800 nm) are suitable as laser source. It is necessary, as indicated diagrammatically in FIG. 1, to provide apparatus elements for guiding the laser radiation to the forming tool 1 or its separate structuring surface 2, but elements of this type are well known to those skilled in the art.

Figure 2:
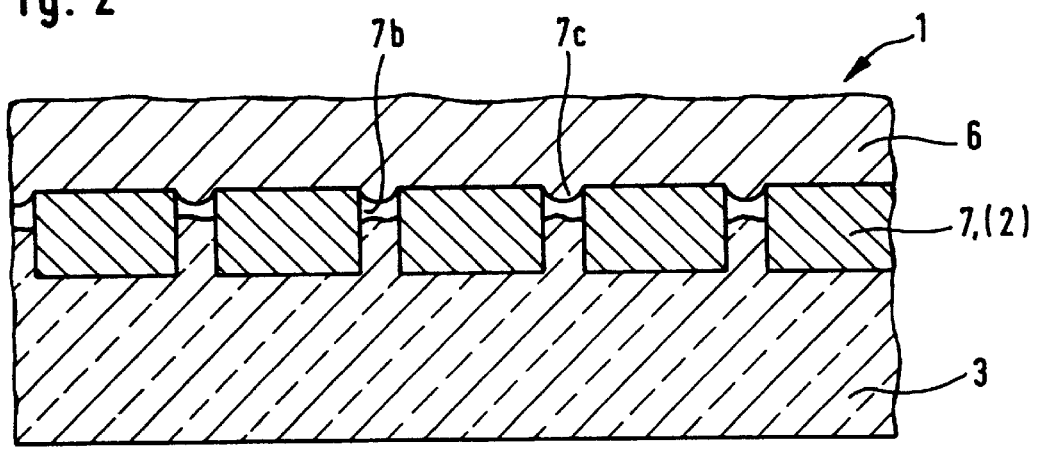
FIG. 2 is a detailed diagrammatic cross-sectional view of a two-part forming tool according to the invention having a base tool and a separate forming member.

The high cost and maintenance expense connected with the above-mentioned high tool wear of the forming tool 1 can advantageously be avoided because, as is particularly clearly shown in FIG. 2, the structuring surface 2 of the forming tool 1 subject to the wear is formed on a separate forming member 7, which is releasably attached to the base tool 6. This forming tool can, as illustrated, be formed by different types of structures. A thin structuring sheet 7 is provided in the example according to FIG. 2, which has throughgoing openings 7b conforming to the crosspieces or crossbars to be formed. As shown in FIG. 2, structures 7c corresponding to the throughgoing openings 7b are provided in the surface of the base tool 6 for positioning of the sheet. These structures are also substantially easier to make than a structured single component tool for direct shaping or forming in flat-display-screen-glass applications. The thin sheet, which forms the structuring surface 2, can have a thickness of about 50 µm to 600 µm, preferably about 100 µm to 250 µm for display applications. The spacing of the throughgoing openings 7b (slits) in the sheet required for forming the crosspieces or crossbars is about 150 µm to 750 µm. Instead of the throughgoing openings 7b in the sheet 7 also cavities or recesses, such as the cups used in printing techniques, can be provided.

An additional advantage of the separation of the base tool 6 from the forming member 7 and/or 2 is that the forming member 7 can be left in the glass until it is cooled after forming of the glass 3. This possibility is illustrated later in greater detail in FIG. 4. A substantially more rapid cooling occurs in comparison to leaving a completely conventional tool on the glass structure because of the reduced heat capacity of the forming tool. Particularly with segmented forming tools provided with throughgoing openings as in the case of the sheet 7 in FIG. 2, stresses and strains between the glass 3 and the forming tool 1 are minimized during cooling, since thermal expansions of the sheet through the throughgoing openings are compensated.

Release of the forming tool 7 can be provided by a conicity of the raised parts of the structuring surface 2.

The sheet 7 subject to wear can be replaced without changing the base tool. Different devices to be described hereinbelow are used for this purpose, especially rapid clamping devices.

A material with reduced thermal expansion and high friction coefficient, especially a special ceramic material, can advantageously be used for the base tool 6 because of the separation of the forming tool parts, namely the structuring sheet 7 from the base tool 6, which can be formed by a roller or piston. Other factors, for example a minimal adherence to glass, higher wear resistance and higher temperature stability, as e.g. attained by the above-mentioned chromium-nickel-steel or platinum-gold alloy, can be considered in the selection of the forming material 7.

Thus it is conceivable to use quarzal as the material for the base tool 6, which has a very reduced thermal expansion coefficient of $0.56 \times 10^{-6}$/K. Then for equal permissible length variations about a 20-fold temperature variation is permitted in comparison to that for steel as the base material. The quarzal material has a reduced thermal conductivity. If then one uses a sufficiently thermal conductive material, e.g. a structured sheet according to FIG. 2, for the forming medium, then an outstanding local isolated heating to the predetermined surface depth is possible according to an advantageous embodiment of the two-component tool. Since quarzal simultaneously has a poor electrical conductivity, alternatively to the use of quarzal as the material for the base tool 6 an inductive or electrical resistance heating of the forming medium 7 is possible.

Figure 3:
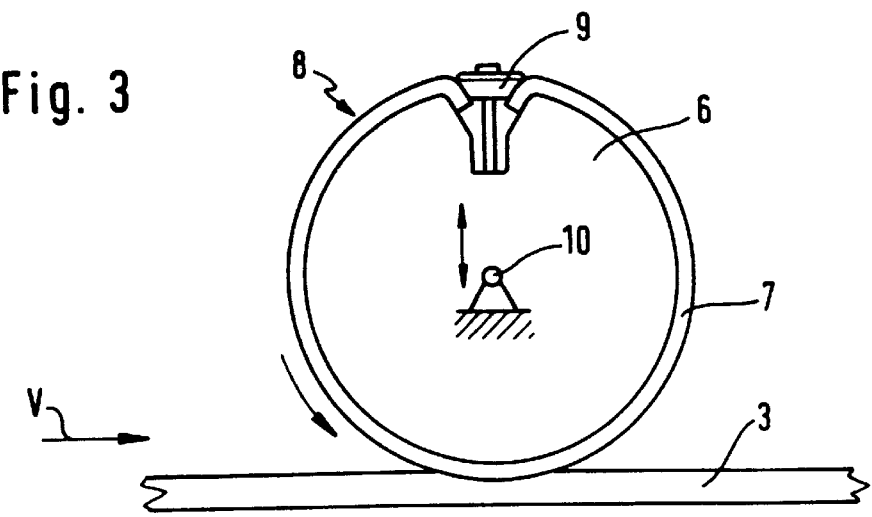
FIG. 3 is a diagrammatic cross-sectional view through a two-part forming tool according to FIG. 2 with a roller as base tool and a perforated sheet wrapped around the roller as forming member.

Different embodiments for the forming tool made from the base tool 6 and the separate forming member 7 are possible, of which several are described with the aid of FIG. 3. FIG. 3 shows a forming tool formed as a roller 8 with a base tool 6 and a forming member 7, here a perforated sheet as in FIG. 2, which is attached by means of a clamping device 9 to the base tool 6. The rotation axis 10 of the roller 8 is locally fixed in the horizontal direction The glass 3 is moved with a relative conveying speed v under the roller 8 which rotates in the direction of the arrow and applies the desired structures on rolling over the surface of the plate glass 3. The vertical forces and displacement of the roller 8 are thus advantageously controlled in order to control the impression depth in the glass 3 or the application of paste-like material. The feed speed of the plate glass 3 is about 0.1 to 1 m/min depending on the roller diameter.

In the embodiment derived from rotogravure printing methods thus the entire base tool is contacted with the forming member. A level or even-surfaced contacting of the forming member 7 on the base tool 6 is guaranteed by suitable clamping methods 9 derived from rotogravure printing methods.

In order to keep the roller axis 10 so that it moves only in a vertical direction, as indicated by the arrow, various construction possibility are available to those skilled in the art. The arrangement can also be designed so that the roller 8 that is pressed against the glass 3 with a comparatively large force F rotates only by displacement of the glass plate 3. A complete drive for rotation of the roller around the axis 10 can be provided.

Figure 4:
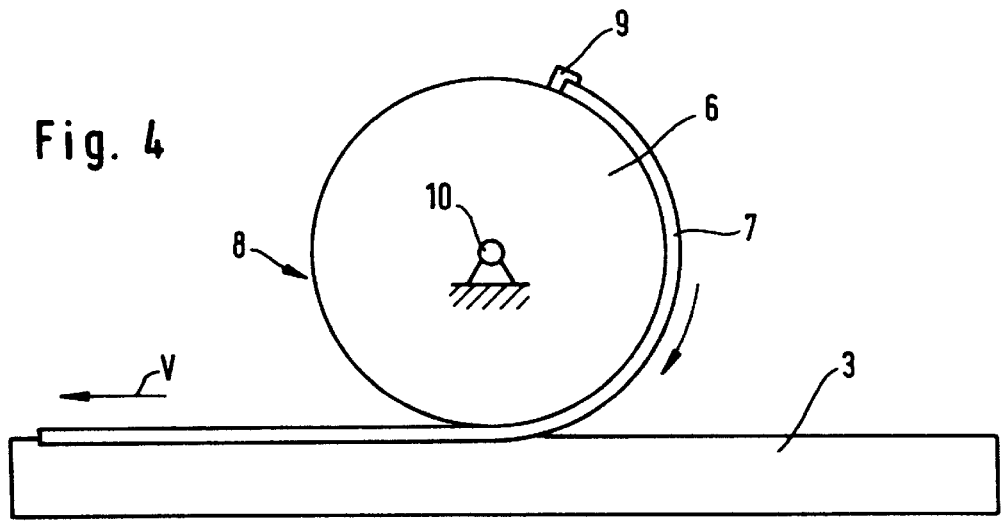
FIG. 4 is a diagrammatic cross-sectional view through a two-part forming tool according to FIG. 2, in which a forming member in the form of a perforated sheet is rolled off the base roller during the rolling of the base roller on the plate glass, is pressed on the glass and remains there during the cooling phase on the glass.

FIG. 4 shows another embodiment for application of the desired structures in or on the plate glass 3 moving horizontally with displacement V by means of a roller 8, which is constructed according to FIG. 3. In contrast to the embodiment of FIG. 3 a forming member in the form of a structuring sheet 7 is pressed on the glass during rolling of the roller 8, unwound from the base tool 6 and left there during the cooling stage. A mechanical stabilization of the glass structure (forming member 7 prevents the flowing away of the still fluid glass) occurs during the cooling stage, which does not occur in conventional hot forming processes. The cooled forming member 7 can be easily removed again from the formed structure because of the greater thermal contraction relative to the glass 3 after forming of the structures in the plate glass 3. A gentle conicity of the raised portions of the forming tool 7 assists this release.

Figure 5:
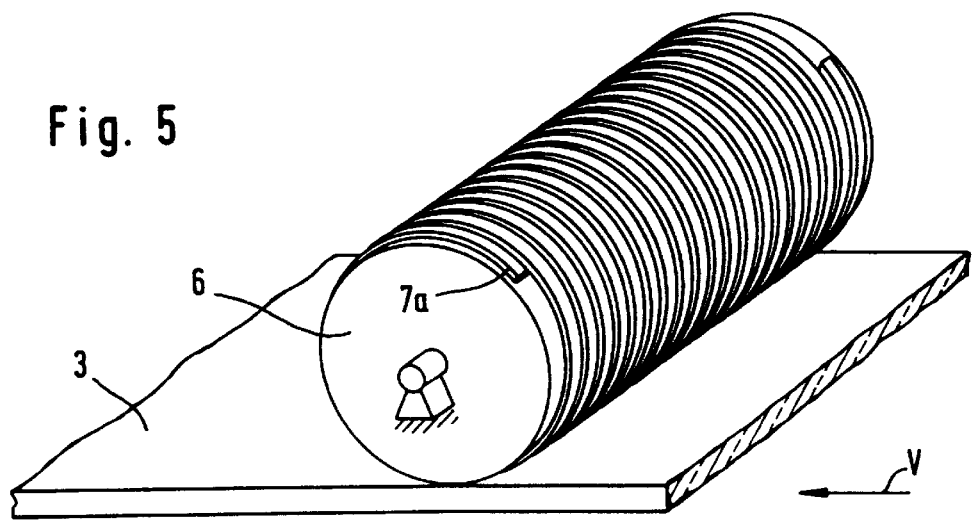
FIG. 5 is a perspective view of a two-part forming tool with a base roller having a strip of material wound around it many times in a coil-like manner.

An additional embodiment is illustrated in FIG. 5, in which the forming tool is not, as in FIGS. 3 and 4, an attached structuring sheet, but is a strip 7a of material wound in a coil-like manner around the roller-like base tool 6. The embodiment of FIG. 5 is so-to-say a variation of the embodiment of FIG. 3 in which instead of a continuous sheet 7, beginning at one end of the roller the strip 7a of material is wound around a base roller 6 along a coil-like pre-structured path which operates to space portions of the strip of material from each other. A modification, namely a gap existing between coils of the strip wound around the base tool 6, is present in this embodiment in contrast to the embodiment of FIG. 3. Because of that the embodiment according to FIG. 5 is dedicated to making linear structures in the plate glass 3, for example, which must be provided in the above-mentioned flat display screens.

Figure 6:
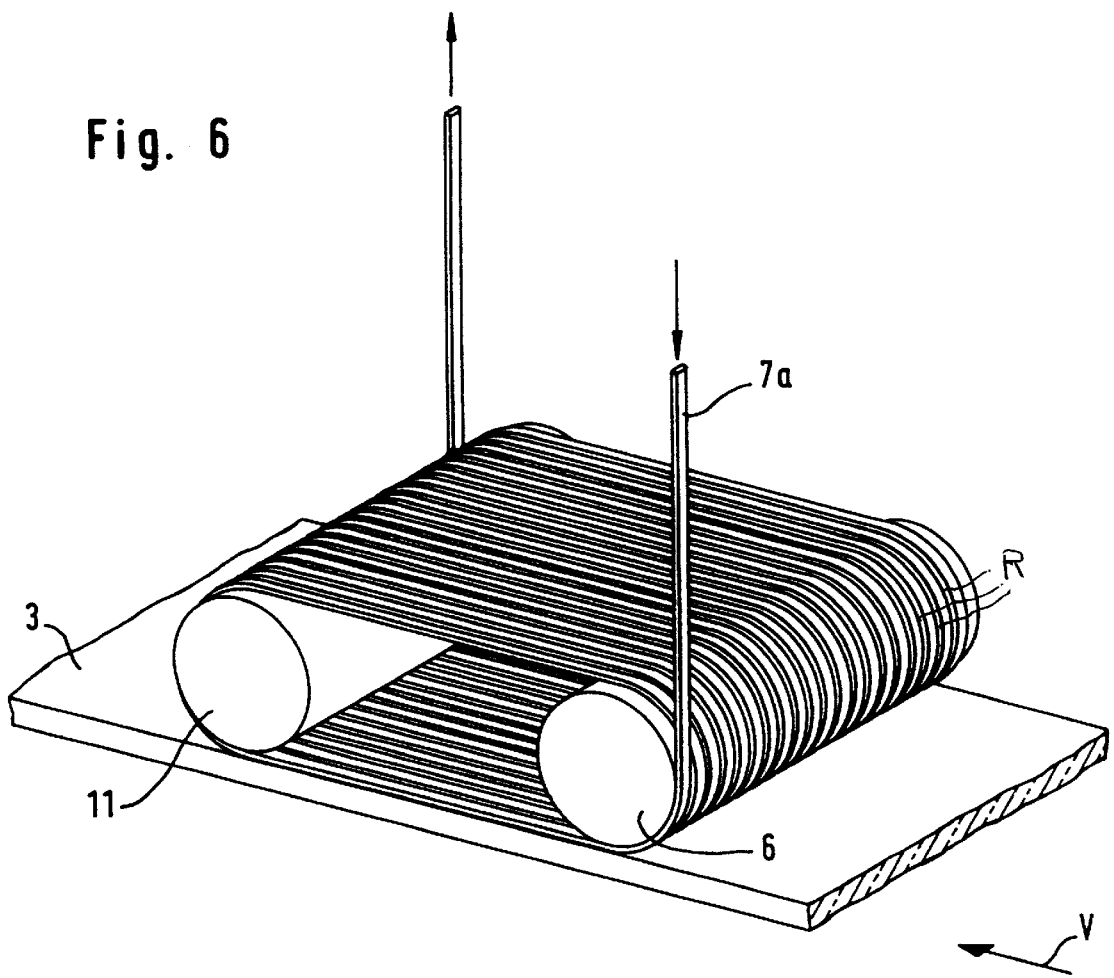
FIG. 6 is a perspective view of a forming tool comprising two axially parallel rollers, of which one is the base roller, with a strip of material as forming member which is wound around them many times.

An additional embodiment, in which the forming tool is not a continuous sheet, but is formed as a strip 7a of material, is shown in FIG. 6. While the strip of material is fixed to the roller 6 in the embodiment of FIG. 5 and this roller 6 with the strip 7a of material is rolled over the surface of the plate glass 3, as shown in the embodiment of FIG. 6, the strip 7a of material is left for a predetermined time on the forming structures after melting of the glass. The embodiment according to FIG. 6 provides two axially parallel rollers, a base roller 6 and an auxiliary roller 11 for this purpose according to the known wafer saw. The base roller 6, at whose one end the strip 7a of material is fed in the direction of the arrow, is provided with closed rings R perpendicular to the roller axis for guiding the strip 7a of material, which also act to position the strip of material. The base roller 6 also serves to press the strip 7a of material for structuring into the plate glass 3 in order to leave it for structuring during the cooling stage in glass 3. During the cooling stage a mechanical stabilizing of the glass structure (no flow) as in the embodiment of FIG. 4, which does not occur in conventional hot forming processes, results. After the structuring the cooled forming strip medium 7a is removed by means of an auxiliary roller 11 axially parallel to the base roller 6. The auxiliary roller 11 is advantageously not structured in order to be able to compensate for an eventual temperature and thus associated length variations of the base roller 6.

The strip of material is taken off at one end of the auxiliary roller 11 according to the shown arrow. It is possible to provide several strip inputs and several outputs.

The strip 7a is guided on the lower auxiliary roller in practice by moving the glass 3, since the glass is very rapidly solidified after structure formation by the strip of material localized on the base roller and because of that the strip 7a in practice is laterally fixed until being taken off from the auxiliary roller 10. The width of the strip 7a forming the structures is from, or from about, 150 μm to 750 μm, less a crosspiece width of from, or from about, 50 μm to 100 μm, advantageously from, or from about, 200 μm to 600 μm. It is also possible to use strips with a width of under 150 μm, which however reduces the friction of the strip. The spacing of strip segments from each other, predetermined by the spacing of the guide rings R on the base roller 6, should be about 20 to 120 μm, advantageously as small as possible. The limiting conditions regarding the adherence to glass and the costs described in connection with the embodiment of FIG. 1 apply to the material from which strip of material used in the embodiment of FIGS. 5 and 6 is made. Since a platinum-gold alloy has a special advantage because of its non-adherence with glass, but on the other hand is however very costly, a solid strip made from this material must be remelted. In order to avoid this expense, alternatively a steel strip is used as base material, which has a suitable tensile strength and is provided with an anti-stick layer.

The spacing between the rollers 6 and 11 can be maintained comparatively small up to close contact because of the rapid cooling of the strip 7a in the glass. It must be guaranteed that the strip 7a of material remains for a few seconds in the melting structure of the plate glass 33 until this structure has cooled. The correct value for the spacing of the roller axes of 200 mm is given for a certain displacement speed; when it changes thus also the suitable value of the spacing and the time interval that the strip of material is in the glass must also change.

Figure 6A:
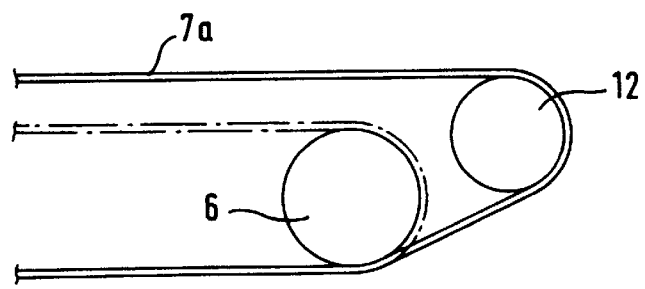
FIG. 6A is a diagrammatic side view of an additional device for the embodiment according to FIG. 6 including a tensioning roller for the purpose of tensioning the strip of material to compensate for thermal expansion during heating.

A third non-structured roller 12 acting as a tensioning roller maintaining the tension in the strip 7a of material is provided in the embodiment according to FIG. 6a, because the strip 7a stretches during heating of it prior to and/or during the contacting of it due to thermal expansion. The strip of material is thus contacted with the base roller only over a small angular range. Suitable structural devices and elements are available for one skilled in the art to construct the embodiment of FIG. 6A.

The disclosure in German Patent Application 197 13 312.6-45 of Mar. 29, 1997 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a forming tool for precision structures, especially in plate glass, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A forming tool for forming structures in plate glass, said forming tool comprising
   a ceramic base tool; and
   a metallic forming member releasably attached to said ceramic base tool and provided with a structuring surface for forming the structures in the plate glass; and
   wherein the metallic forming member comprises a structured metal sheet provided with a plurality of through-going openings or cavities for forming the structures in the plate glass;
   whereby said base tool has a comparatively small thermal conductivity and said forming member has a comparatively high thermal conductivity.

2. The forming tool as defined in claim 1, wherein the metallic forming member comprises steel, a platinum-gold alloy or a chromium-nickel-steel alloy.

3. The forming tool as defined in claim 1, wherein said structured metal sheet has a thickness of from 50 μm and 600 μm.

4. The forming tool as defined in claim 3, wherein said thickness is from 100 μm and 250 μm.

5. The forming tool as defined in claim 4, wherein said openings or cavities are spaced about 150 μm and 750 μm from each other.

6. The forming tool as defined in claim 1, wherein the structured metal sheet is releasably attached to said base tool, so that said structured metal sheet can be rolled off of said base tool.

7. The forming tool as defined in claim 6, wherein the base tool has a structural element for attaching the forming member to the base tool.

8. The forming tool as defined in claim 1, wherein said ceramic base tool is a base roller.

9. The forming tool as defined in claim 1, wherein the structuring surface includes raised portions having a predetermined conicity for facilitating release of the forming member from the structures formed in the glass plate.

10. A forming tool for forming structures in plate glass, said forming tool comprising a ceramic base roller and a separate forming member consisting of a metallic strip wound around said ceramic base roller, said metallic strip providing a structuring surface for forming the structures in the plate glass,
   wherein the ceramic base roller has a guiding structure with a coil-shaped path for guiding the metallic strip around the base roller;
   whereby said ceramic base roller has a comparatively small thermal conductivity and said separate forming member has a comparatively large thermal conductivity.

11. The forming tool as defined in claim 10, wherein said metallic strip has a width of from about 150 μm to 750 μm minus a crosspiece breadth of from about 50 μm to 100 μm.

12. The forming tool as defined in claim 11, wherein said width of said metallic strip is from about 200 μm to 600 μm.

13. The forming tool as defined in claim 11, wherein said metallic strip wound around the base roller comprises adjacent coils of metallic material and said adjacent coils are spaced from about 20 μm to 120 μm from each other in an axial direction on said base roller.

14. The forming tool as defined in claim 10, further comprising a second or auxiliary roller arranged axially parallel to the base roller, and wherein the guide structure includes closed rings spaced from each other in an axial direction on said base roller, and said metallic strip is wound around said base roller between the closed rings during continuous feed and take-off of the metallic strip.

15. The forming tool as defined in claim 14, wherein the base roller has at least one feed device for the metallic strip and the auxiliary roller has at least one take off device for the metallic strip.

16. The forming tool as defined in claim 14, further comprising an additional tensioning roller for clamping the metallic strip passing around the base roller and the auxiliary roller.

* * * * *